Nov. 11, 1947.  S. ABRAMSON  2,430,441

LUBRICATING FITTING CAP

Filed June 29, 1945

Inventor
Seth Abramson.

Attorney

Patented Nov. 11, 1947

2,430,441

UNITED STATES PATENT OFFICE 2,430,441

LUBRICATING FITTING CAP

Seth Abramson, Renton, Wash.

Application June 29, 1945, Serial No. 602,285

1 Claim. (Cl. 184—88)

The present invention relates to a protector for lubricating devices. It is particularly concerned with improvements in lubricating devices forming a part of that type of lubricating system which comprises a plurality of fittings adapted to be respectively secured to the bearings to be lubricated and a compressor, the discharge conduit of which is provided with a coupling for successively connecting the compressor with the fittings in sealed relation, so that lubricant can be supplied to the bearings under pressure.

It is often the case that the fittings secured to the bearings are exposed to dust, dirt and water. It is a primary object of the present invention to provide a cap for effectively protecting these fittings from injurious matter.

Another object of the invention is to provide simpler and more compact construction than that of prior devices.

A further object of the invention is to provide a cap for the lubricant fitting which effectually seals the passage of the fitting and can be readily put on and taken off.

With the foregoing and other objects and advantages in view the invention consists of the construction and arrangement of parts hereinafter described and claimed.

In the accompanying drawings illustrating the invention,

Like numerals designate the same parts of construction throughout the drawings.

Figure 1:
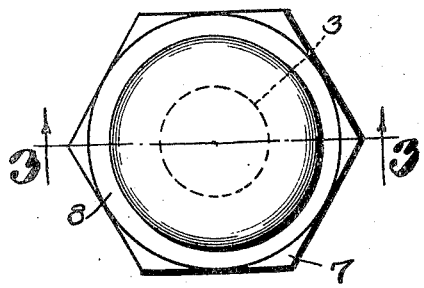
Figure 1 is a top plan view of the cap.
Figure 4:
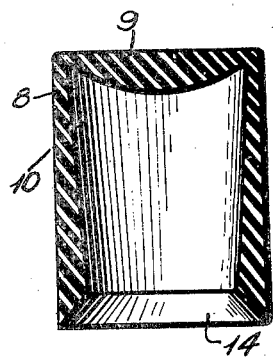
Figure 4 is a vertical transverse sectional view of the outer element of the cap.
Figure 2:
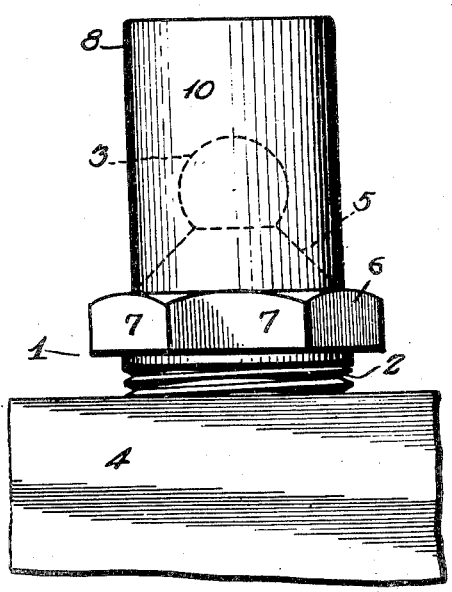
Figure 2 is a side elevation thereof.
Figure 3:
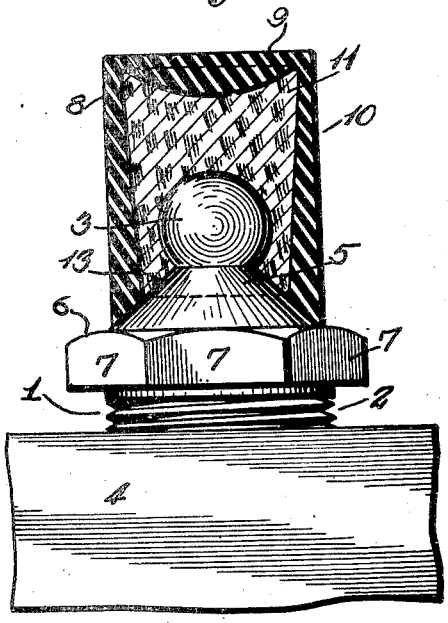
Figure 3 is a vertical transverse sectional view of the cap taken on line 3—3 of Figure 1 and showing it in place on a lubricant fitting.
Figure 5:
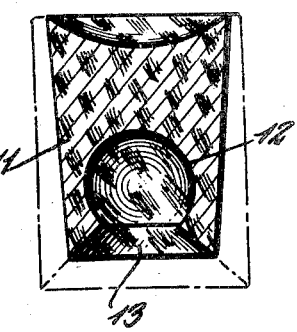
Figure 5 is a vertical transverse sectional view of the inner element and showing the outer element in dotted lines.

1 is a conventional type of lubricant fitting provided with a threaded shank 2 fitted in the internally threaded aperture in a part of the automobile adjacent the bearing to be lubricated. A central conduit or passage runs through 1 from its spherical shaped nipple 3 to a passage in automobile part 4 leading to the bearing. The head of fitting 1 is formed with the supporting cone-shaped shoulder 5 beneath which is a flanged section 6 provided with facets 7 to receive the jaws of a wrench or other device used for threading the shank of the fitting in place. The nipple is of the usual construction with valve and spring to close the passage through the fitting when the compressor is detached. The operation of the compressor with its dispensing nozzle is well known. The nipple 3 of the lubricant fitting is adapted to be engaged by the nozzle through a wide angular range.

The cap 8 for the lubricant fitting 1 is an essential feature of this invention. Its exterior wall is substantially cylindrical in form and the cap has a closed top 9 and an open bottom. It is made in two parts which are fitted together. The outer part 10 is made of rubber and the inner part 11 is made of cork. Part 11 is constructed with a centered spherical recess 12 provided at the bottom with a flared opening 13 and is adapted to fit the nipple 3 and adjoining portion of cone-shaped shoulder 5 of the lubricant fitting. The circumference of the interior wall of part 10 is increased gradually from its bottom to the top, thus producing a cone-shaped interior. The under surface of the top is convexed to seat in the concaved top of part 11. The exterior of part 11 is substantially cone-shaped. This shape results from gradual increase of the circumference of this part from its bottom to its concaved top. The size of the outer wall of part 11 conforms to the size of the interior of part 10 so that a tight fit is assured and the cork member is firmly held in place when the two parts are assembled to form the complete cap. The opening in the bottom of part 10 is flared, as at 14, to conform to and provide a continuation of the flared orifice 13 of the recess 12 in the cork member 11. It will be obvious from the foregoing description that the cap 8, when forced into engagement with the nipple of the fitting, will effectively protect the fitting from any injurious matter which otherwise could infiltrate through the nipple and into the passage of the fitting.

Having thus described my invention what I claim as new and desire to secure by Letters Patent, is:

In a cap for protecting the nipple of grease fittings to which grease guns are applied, the combination, which comprises, an absorbent liner of cork or the like shaped to conform to an inverted frustrum of a cone being larger in cross section at the upper end, said liner having a socket with a constricted throat for receiving the nipple of the fitting; and an outer resilient protecting cover of rubber or the like enclosing said liner, said cover also having a constricted throat with a gradually enlarging inner opening also larger at the upper end providing mounting means securing the said liner therein, the lower fitting contacting surfaces of said liner and cap flared outwardly from the socket of the liner for contact with an engaging surface of a fitting.

SETH ABRAMSON.

REFERENCES CITED

The following references are of record in the file of this patent:

UNITED STATES PATENTS

| Number | Name | Date |
|---|---|---|
| 366,732 | Luyties | July 19, 1877 |
| 1,379,609 | Barry | May 31, 1921 |
| 1,644,253 | Johnson | Oct. 4, 1927 |
| 2,379,529 | Kennedy | July 3, 1945 |